United States Patent
Maise et al.

(10) Patent No.: US 9,599,482 B2
(45) Date of Patent: Mar. 21, 2017

(54) METHOD AND CENTRAL PROCESSING UNIT FOR THE UNMANNED CONTROL OF A VEHICLE

(71) Applicant: Dr. Ing. h.c. F. Porsche Aktiengesellschaft, Stuttgart (DE)

(72) Inventors: Timo Maise, Ludwigsburg (DE); Wolfgang Herdeg, Rutesheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 24 days.

(21) Appl. No.: 14/680,101

(22) Filed: Apr. 7, 2015

(65) Prior Publication Data

US 2015/0285645 A1 Oct. 8, 2015

(30) Foreign Application Priority Data

Apr. 7, 2014 (DE) .................. 10 2014 104 881

(51) Int. Cl.
*G01C 21/34* (2006.01)
*G01S 19/13* (2010.01)
(Continued)

(52) U.S. Cl.
CPC ......... *G01C 21/34* (2013.01); *B62D 15/0285* (2013.01); *G01S 19/13* (2013.01);
(Continued)

(58) Field of Classification Search
CPC ...... B62D 15/0285; G08G 1/005; G08G 1/00; G08G 1/148; G08G 1/205;
(Continued)

(56) References Cited

U.S. PATENT DOCUMENTS

2010/0004802 A1* 1/2010 Bodin .................. G05D 1/0094
701/11
2013/0231824 A1 9/2013 Wilson et al.
(Continued)

FOREIGN PATENT DOCUMENTS

DE 10 2007 042 412 3/2009
WO 2013/154967 10/2013

OTHER PUBLICATIONS

German Search Report of Dec. 15, 2014.

*Primary Examiner* — Nga X Nguyen
(74) *Attorney, Agent, or Firm* — Gerald E. Hespos; Michael J. Porco; Matthew T. Hespos

(57) ABSTRACT

A method is provided for unmanned control of at least one vehicle by a central processing unit. The central processing unit controls the at least one vehicle on a route determined by the central processing unit from a first location on the route to at least one second location on the route. The second location on the route is a parking site. The central processing unit further controls the vehicle so that the vehicle, after a parking operation at the second location, is provided automatically to a user for acceptance at a retrieval location as further location on the route. The route is calculated by the central processing unit dynamically depending on information concerning further routes for further vehicles managed by the central processing unit.

19 Claims, 2 Drawing Sheets

(51) Int. Cl.
    *G08G 1/00*     (2006.01)
    *B62D 15/02*     (2006.01)
    *G05D 1/02*     (2006.01)
    *G08G 1/005*     (2006.01)
    *G08G 1/14*     (2006.01)
    *H04W 4/04*     (2009.01)
    *G08G 1/0968*     (2006.01)

(52) U.S. Cl.
    CPC ............. *G05D 1/0297* (2013.01); *G08G 1/00* (2013.01); *G08G 1/005* (2013.01); *G08G 1/148* (2013.01); *G08G 1/205* (2013.01); *H04W 4/046* (2013.01); *G05D 2201/0213* (2013.01); *G08G 1/096816* (2013.01); *G08G 1/096883* (2013.01)

(58) Field of Classification Search
    CPC ....... G08G 1/096816; G08G 1/096883; G05D 1/0297; G05D 2201/0213; G01C 21/34; H04W 4/046; G01S 19/13
    USPC .................................. 701/23–25, 36–37, 51
    See application file for complete search history.

(56) References Cited

U.S. PATENT DOCUMENTS

2015/0284010 A1* 10/2015 Beardsley ............. B60W 50/10
    701/41
2016/0111000 A1* 4/2016 Chinomi ................ G06Q 10/08
    340/932.2

* cited by examiner

METHOD AND CENTRAL PROCESSING UNIT FOR THE UNMANNED CONTROL OF A VEHICLE

CROSS REFERENCE TO RELATED APPLICATION

This application claims priority under 35 USC 119 to German Patent Appl. No. 10 2014 104 881.4 filed on Apr. 7, 2014, the entire disclosure of which is incorporated herein by reference.

BACKGROUND

1. Field of the Invention

The invention relates to a method for the unmanned control of at least one vehicle by a central processing unit from a retrieval location to a parking site and back again, and to a corresponding central processing unit.

2. Description of the Related Art

Parking possibilities, such as parking sites, are becoming increasingly scarce in conurbations in view of a constantly increasing population density and an associated increase in a number of vehicles. Accordingly, a user of a vehicle in a conurbation is spending more time searching for a possible parking site or accepts a longer walk from a parking site to a respective destination location. As a result, a respective journey duration may increase significantly.

Methods for helping a driver find a parking site are described in the prior art. In this regard, U.S. Pat. No. 8,589,065 discloses a navigation method for finding a route to a parking site that corresponds to factors selected in advance. For this purpose, parking sites sorted according to a respective factor can be displayed to the driver on a map.

WO 2013/154967 A1 discloses a method for managing parking site resources, wherein information about a respective parking site is compiled in a data stream and made available when the respective parking site is reserved or booked.

Against this background, it is an object of the invention to control a vehicle so that the vehicle drives autonomously, i.e. in an unmanned fashion, from a handoff location to a respective parking site, parks there, and "retrieves" a user as required at a suitable retrieval location, so that the user can accept and control the vehicle.

SUMMARY OF THE INVENTION

The invention relates to a method for unmanned control of at least one vehicle by a central processing unit or a central computer. The central processing unit controls the vehicle on a route determined by the central processing unit from a first location on the route to at least one second location on the route. The second location on the route is a parking site. The central processing unit the vehicle controls so that, after a parking operation at the second location, the vehicle is provided automatically to the user for acceptance at a retrieval location on the route. The route is calculated by the central processing unit dynamically depending on information concerning further routes for further vehicles managed by the central processing unit.

The method of the invention may be based on the use of a central processing unit that links to a vehicle via wireless communication, such as a GSM network or LTE network, wireless LAN, Bluetooth or any further technically suitable method for wireless communication. Upon activation by a driver or user of a vehicle, the method of the invention controls the vehicle so that the vehicle navigates or is controlled from a first location on a route to a second location. The first location may be a handoff location to which the vehicle was controlled by the driver, or a location at which the method was activated by the user or driver, or a further location, such as a destination location of user-dependent route guidance. The second location is a parking site.

The central processing unit controls the vehicle e.g. to a closest parking site, parks the vehicle there and monitors it, e.g. by a sensor system of the vehicle, such as a GPS sensor, until the vehicle is requested by the user or a further authorized user.

The central processing unit may control the vehicle from a parking site either to a retrieval location that is closest to the user or to a retrieval location that enables the user to accept the vehicle as rapidly as possible.

An authorized user may be a user who has an authorization for using the vehicle, such as a key or an access code.

The method of the invention can be compared with a parking service for a hotel, for example, insofar as a respective vehicle can be handed off by a user at one location and can be accepted again if appropriate at a different location or at the same location, wherein the vehicle is managed, i.e. parked, between handoff and acceptance.

In the context of the invention, a route should be understood to mean route guidance from a first location to at least one second location and back again to a retrieval location. The retrieval location can be the first location. The route guidance may be calculated dynamically. Dynamically means that different route guidance with respect to an outgoing journey to the second location may be chosen or calculated on a return journey from the second location to the retrieval location.

In contrast to a parking service with employees, however, the central processing unit can manage respective routes of vehicles of an entire vehicle fleet, e.g. all vehicles of a brand, of a corporation, or all vehicles in a specific region. Thus, routes of respective vehicles of the vehicle fleet can be coordinated optimally with one another, i.e. calculated dynamically, and possible delays among the vehicles, e.g. due to waiting in right of way situations, can be avoided. The central processing unit manages a number of vehicles and controls a respective vehicle upon activation of the method of the invention automatically, e.g. to a parking site or along a round trip, and makes it available again to the user as required.

In the context of the invention, a dynamic calculation of a route should be understood to mean a calculation in which a calculated route is recalculated, if appropriate, depending on information concerning e.g. routes of further vehicles and/or a traffic situation or a changed position of a user. Thus, the route is adapted dynamically to possibly changing conditions or information.

Centrally managed fleet management enables an infrastructure of a parking site to be utilized optimally, so that exits are not blocked and traffic volume is distributed among available exits or parking sites. The centrally controlled fleet management uses plural parking sites to avoid waiting times attributable to spatial or temporal proximity to an overcrowded retrieval location. Thus, the central processing unit establishes reservoirs, i.e. zones at which vehicles are parked temporarily until a user has arrived on site and/or the retrieval location is accessible to the respective vehicle.

The term "spatial" or "temporal" proximity should be understood to mean a distance that enables the central processing unit to control the vehicle to a desired retrieval location depending on a current situation at said retrieval location. Suitable distances might be 100 meters to 1000 meters or a journey time of 10 seconds to 120 seconds.

The retrieval location may be determined depending on a position of a communication device of the user and is communicated to the user by the central processing unit on the communication device.

A retrieval location may be based partly on a current position of the user. The current position of the user may be determined by GPS or some other technically suitable locating or position determining system and the respective vehicle is controlled by the central processing unit to a retrieval location that is ascertained on the basis of the determined position of the user and that is suitable for the respective vehicle to drive thereto promptly.

The term "control" may mean acting on actuators of vehicle so that the vehicle automatically moves through road traffic. The central processing unit may control a vehicle by calculating a route to a location, such as a parking site or a retrieval location, and communicates the route to the vehicle. The vehicle then uses vehicle control software of the vehicle and/or of the central processing unit to drive along the route provided by the central processing unit with monitoring by the central processing unit.

The central processing unit may execute central vehicular control software that calculates control commands for e.g. actuators and/or control units of a respective vehicle and transmits the commands to the respective vehicle by e.g. a relay station or other means of wireless communication.

The retrieval location may be calculated by the central processing unit to minimize a distance to the retrieval location that is to be covered on foot for a user.

A shortest possible walk and a shortest possible journey duration for a user of a vehicle are made possible by having the vehicle drive the user autonomously to a handoff location from where the user reaches his/her destination as rapidly as possible and/or by the shortest possible way.

The vehicle may be controlled by the central processing unit first with the user to a destination location or handoff location as the first location on the route, where the user leaves and hands off the respective vehicle. The vehicle then may be parked on a parking site as second location and as required by the user may be provided again at the destination location as retrieval location.

The central processing unit may determine the route depending on a current capacity utilization of respective roads and/or parking sites to be used.

The vehicle may be dispatched to a retrieval location early if a route calculated by the central processing unit has a high capacity utilization of roads so that the user can be retrieved punctually at a predefined time. The central processing unit may call up information from a traffic database, such as traffic radio, "Googlemaps", or other traffic database that is technically accessible over the Internet, and uses the information when calculating the route to ensure timely arrival retrieval location.

The central processing unit may determine the route to a closest parking site with usage charges that lie within a budget predefined by the user.

The method can be used to avoid incurring parking charges in a densely trafficked or densely populated area and to park the vehicle at a less densely populated area and at a more favorable parking site. For this purpose, the central processing unit may determine parking charges of respective parking sites in a specific area and/or within a specific budget to be predefined, e.g. over the Internet or by an internal memory, and displays them to the user on a map.

The user then selects a corresponding parking site to which the vehicle is to be controlled by the central processing unit.

The vehicle may arrive at a defined retrieval location at a defined time. The defined time can be provided with a fluctuation of up to +/−1 min, preferably +/−30 s.

In the case of events that entail a high volume of people, such as e.g. a shift change in a large company, an end of an event in a sports stadium or the like, it be expedient for the vehicle to be controlled by the central processing unit so that the vehicle is provided at a specific time at a retrieval location predefined by the user, for example, for the respective user and/or a further user.

The user of a first vehicle may be retrieved from a retrieval location by a second vehicle and may be transported to the first vehicle. The user of the first vehicle and the user of the second vehicle may be informed of the transport beforehand by the central processing unit and the first and second users may instigate changes, if appropriate, in planning necessary for transport by the central processing unit.

In the case of a particularly dense volume of traffic, vehicles managed by the central processing unit may be used to transport users of other vehicles managed by the central processing unit to their vehicles, thereby shortening a waiting time for both the persons to be transported and the users of the transporting vehicles. For example, vehicles whose users have not yet arrived at the respective retrieval location and/or vehicles that have a particularly large carrying capacity for a large number of persons may be suitable for transporting users to their vehicles.

The method of the invention overcomes spatial bottlenecks and temporal delays. For this purpose, the central processing unit could take account of current traffic when estimating a start time for a journey to a handover point, i.e. retrieval location for providing a vehicle for a user.

The central processing unit knows parking locations, handoff locations and provision requirements of all vehicles managed by the central processing unit and, if appropriate, of further vehicles, and hence can minimize difficulties, such as tardiness of the vehicle or tardiness of the user.

The whereabouts of the user may be determined and communicated to the central processing unit during a parking operation, i.e. a time during which a respective vehicle is parked on a parking site. Thus, the central processing unit has the possibility of communicating messages, such as e.g. a change in the handoff location, to the user.

The central processing unit has knowledge about provision requirements, i.e. enquiries for acceptance of a vehicle at a retrieval location by a user and about current whereabouts of users and vehicles. Thus, the central processing unit can coordinate provision requirements and can inform users of possible changes of retrieval location or acceptance time e.g. depending on a current position of a user.

The invention also relates to a central processing unit that is configured to determine a route from a first location to at least one second location, with at least one of the locations being a parking site. The central processing unit dynamically determines the route depending on routes calculated for further vehicles and on a current traffic situation on roads to be used, e.g. using navigation software or a suitable navigation method. The central processing unit is configured to control the vehicle by wireless communication, so that the at least one vehicle is controlled from the first location to the second location and, after parking at the second location, to a retrieval location at a time predefined by a user of the vehicle.

The central processing unit monitors or controls a multiplicity of vehicles and coordinates respective control commands of vehicles among one another. Furthermore, the central processing unit informs users of vehicles about a state or a position of the vehicle and about changes of the retrieval location or arrival time that may arise.

The central processing unit may act on a multiplicity of vehicles in a coordinated manner so that backups are avoided, parking lots are utilized optimally and convenience for a user of a vehicle is increased. For this purpose, the central processing unit can control vehicles in blocks or clusters over a respective road, thereby preventing the formation of backups or preventing the road from being blocked. Furthermore, the central processing unit and the method according of the invention reduce or avoid journeys to seek an available parking site by users, thus reducing a burden on the environment and on the health of a population in a conurbation.

The central processing unit of the invention may be used for managing a rental vehicle system or car sharing system, such that for a potential renter of a vehicle a vehicle is automatically provided at a location selected by the potential renter and after the end of a respective rental or use contract the vehicle is controlled automatically to a parking site or a further renter.

In one configuration of the central processing unit according to the invention, it is provided that the central processing unit is configured to control all vehicles to be managed by the central processing unit such that all vehicles are accepted as rapidly as possible by respective users. For this purpose, it is provided that the central processing unit has means for wireless communication or means for controlling means for wireless communication.

Coordination of vehicles managed by the central processing unit among one another enables the managed vehicles to be controlled to respective retrieval locations as rapidly as possible so that all users can accept their vehicles as rapidly as possible while reducing the burden on a traffic infrastructure. This means that the central processing unit possibly controls individual vehicles in a disadvantaged manner, i.e. controls them in such a way that they arrive at a respective retrieval location with delays, so that other vehicles make considerably faster progress and a current traffic flow is maintained and an average waiting time e.g. of all users waiting at a retrieval location is reduced.

The central processing unit is configured, depending on a request by a user, to control a vehicle of the user after a parking operation so that the user can accept the vehicle as rapidly as possible at a retrieval location.

The central processing unit can provide prioritized acceptance of a vehicle for individual selected users in exchange for a payment, and can rapidly control the vehicle of the prioritized user to a respective retrieval location independently of other managed vehicles even if the average waiting time of all further users increases as a result.

The central processing unit of the invention is configured to perform the method of the invention.

The features mentioned above can be used in the combination indicated, in other combinations or by themselves, without departing from the scope of the invention.

DETAILED DESCRIPTION

Figure 1:
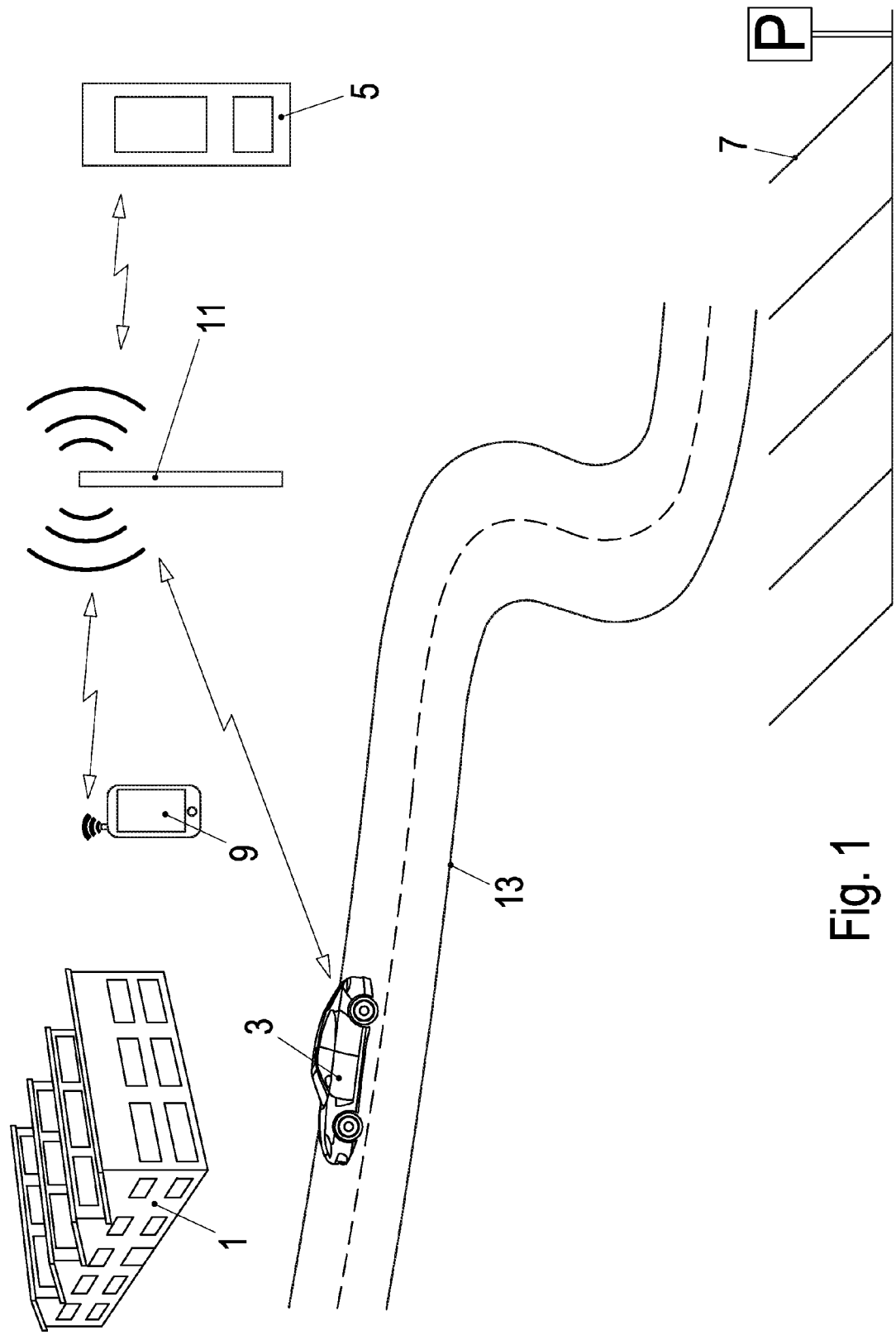
FIG. 1 is a schematic overview of one possible configuration of the method of the invention for managing a vehicle by means of one embodiment of a central processing unit provided according to the invention.

The overview illustrated in FIG. 1 shows a handoff location 1 as first location on a route, which corresponds here to a user's place of work. To keep the user's commute as short as possible, it is provided that a vehicle 3 of the user is controlled in an automated manner, i.e. using a central processing unit 5 from the handoff location 1 to a parking site 7 and, at a time ascertained by the user once again to the handoff location 1, which thus corresponds to a corresponding retrieval location in the example shown here.

The user activates the method of the invention at the handoff or retrieval location 1 to hand the vehicle 3 over to the central processing unit 5, e.g. by an application executed on a smartphone 9 of the user or by a button in the vehicle 3 itself.

As soon as the method of the invention has been activated, the vehicle 3 and central processing unit 5 link via, in the scenario illustrated here, a relay station 11 in the form of a telecommunication network. This means that the vehicle 3 communicates to the central processing unit 5 information, e.g. about a current position and/or information about current settings of actuators required for controlling the vehicle 3. The central processing unit 5 receives the information communicated by the vehicle 3, if appropriate interrogates further information from the vehicle 3 and calculates a route 13 from the handoff location 1 to the parking site 7. Furthermore, the central processing unit 5 matches the calculated route 13 with a current volume of traffic and route information of further vehicles managed by the central processing unit 5 and changes the route 13, if appropriate, so that a journey time and/or a fuel consumption are minimized.

To control the vehicle 3 to the parking site 7, the central processing unit 5 communicates control commands, such as values for settings of actuators for changing a speed of the vehicle 3 and/or position information to a control unit of the vehicle 3 that evaluates and correspondingly implements the control commands so that the vehicle 3 moves on the route 13 in accordance with instructions from the central processing unit 5.

The vehicle 3 provides the central processing unit 5 with information from a vehicle-side sensor system, for example, so that the central processing unit 5 can correspondingly adapt the control commands and initiate a braking maneuver, for example, if the sensor system supplies indications that necessitate such a maneuver.

The central processing unit 5 parks the vehicle 3 on a suitable area at the parking site 7 and controls the vehicle 3 back to the handoff location 1 if the user sends a provisional enquiry via the smartphone 9 to the central processing unit 5 or the relay station 11 or if an appointed retrieval time specified by the user in advance approaches.

The central processing unit 5 that knows a fixed appointed retrieval time or appointed acceptance time controls the vehicle 3 so that the vehicle 3 departs early and, depending on current traffic conditions at the parking site 7, approaches the handoff location 1 if appropriate on a different route than the route 13. The vehicle 3 then arrives at the handoff location 1 and is ready for acceptance by the user.

The vehicle 3 may be controlled by the central processing unit 5 to a further location during a journey to the parking site 7, such as e.g. a car wash or service company, before the vehicle 3 is parked at the parking site 7, thereby relieving the burden on the user of journeys e.g. for servicing or caring for the vehicle 3.

Figure 2:
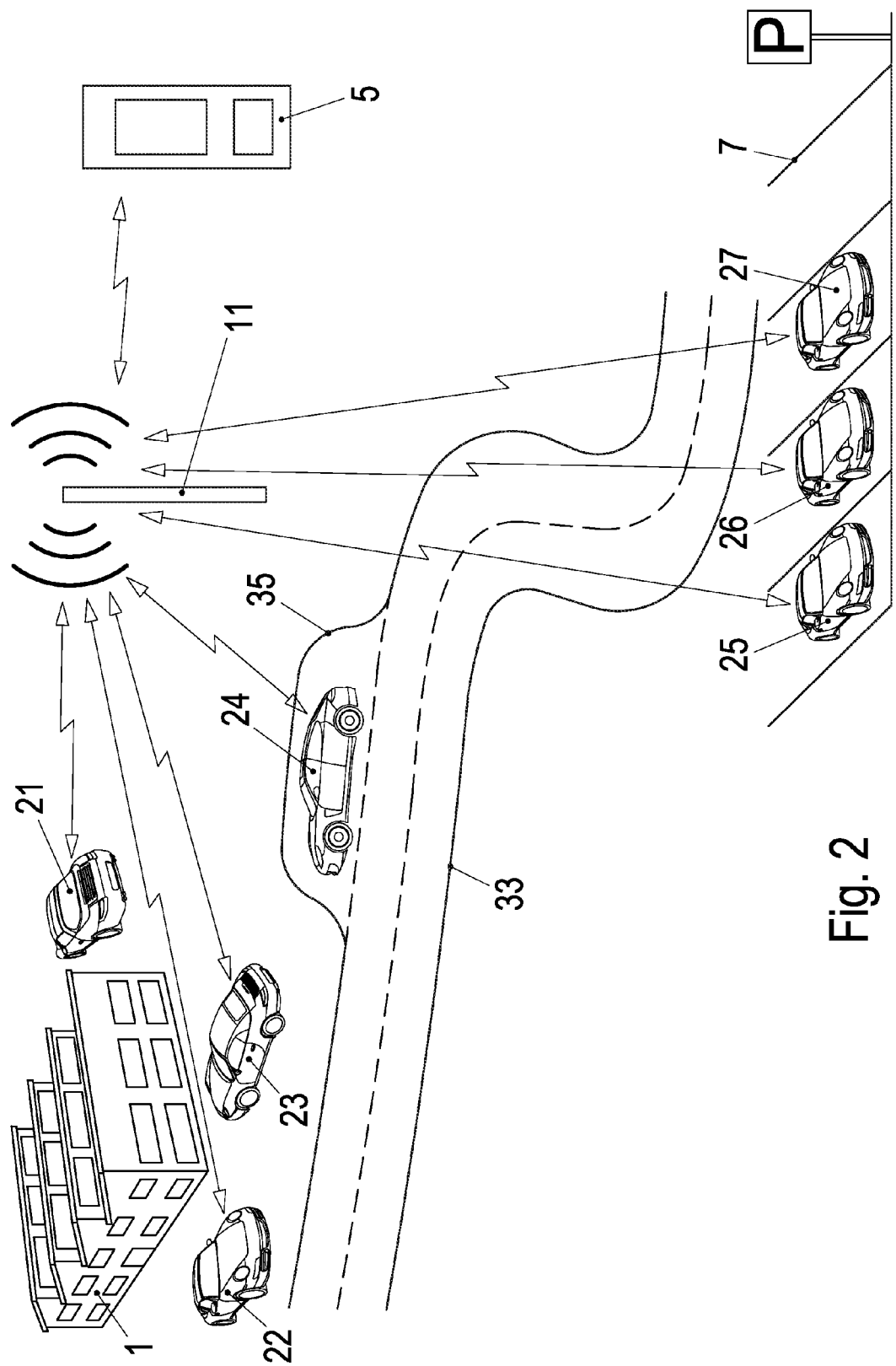
FIG. 2 shows a schematic overview of one possible configuration of the method according to the invention for the coordination of a vehicle fleet.

FIG. 2 shows management of a vehicle fleet, consisting of vehicles 21, 22, 23, 24, 25, 26 and 27, by the central processing unit 5.

To retrieve a number of users e.g. from a sporting event at the handoff location 1 by means of respective vehicles 21, 22, 23, 24, 25, 26 and 27, or to park the vehicles 21, 22, 23, 24, 25, 26 and 27 on the parking site 7 and to make them available to the respective users for acceptance at the handoff location 1 at a specific acceptance time, the central processing unit 5 may link to the respective vehicle 21, 22, 23, 24, 25, 26 or 27 and automatically control them to the handoff location 1, where the users of the vehicles 21, 22, 23, 24, 25, 26 or 27 leave the vehicle, upon activation of the method, e.g. initiated by the respective vehicle 21, 22, 23, 24, 25, 26 or 27 driving on company grounds. From the handoff location 1 to the parking site 7, the central processing unit 5 calculates, depending on a current traffic situation, a route 33 along which the respective vehicles 21, 22, 23, 24, 25, 26 and 27 are controlled to the parking site 7. The route 33 may be blocked. However, the central processing unit 5 can control respective vehicles 21, 22, 23, 24, 25, 26 and 27, if appropriate, at different times or within a convoy along the route 33, so that the burden on the route 33 is reduced and respective vehicles 21, 22, 23, 24, 25, 26 and 27 arrive at the parking site 7 as rapidly as possible or with the lowest possible fuel consumption. In this case, the vehicles 21, 22, 23, 24, 25, 26 and 27 link to the central processing unit 5 via the relay station 11 and exchange information with the central processing unit 5. The central processing unit 5 can forward, if appropriate, information of respective vehicles 21, 22, 23, 24, 25, 26 or 27 to the vehicles 21, 22, 23, 24, 25, 26 and 27, such that the vehicles 21, 22, 23, 24, 25, 26 and 27, if appropriate, maintain distances to e.g. adjacent vehicles 21, 22, 23, 24, 25, 26 or 27.

For controlling the vehicles 21, 22, 23, 24, 25, 26 and 27, the central processing unit 5 can calculate respective control commands itself and directly control respective actuators of the vehicles 21, 22, 23, 24, 25, 26 and 27 or supply a respective central control unit of the respective vehicle 21, 22, 23, 24, 25, 26 or 27 with position information, so that the respective central control unit generates necessary control commands of the actuators and controls the actuators.

To ensure punctual retrieval of the respective users by the vehicles 21, 22, 23, 24, 25, 26 and 27, the central processing unit 5 can coordinate the vehicles 21, 22, 23, 24, 25, 26 and 27 among one another, e.g. temporarily park vehicle 24 at e.g. a parking bay 35 on the route 33 until there is room for entry at the handoff location 1 and the vehicle 24 can be provided at the handoff location 1 punctually in this way.

What is claimed is:

1. A method for unmanned control of a first vehicle of a plurality of vehicles, the method comprising:
   transferring operational control of the first vehicle of the plurality of vehicles from a user of the first vehicle to a central processing unit when the user exits the first vehicle at a first location;
   operating the central processing unit to control unmanned movement of the first vehicle along a first route of a plurality of routes determined by the central processing unit from the first location to a parking site where the first vehicle is to remain at rest for a period of time;
   after the period of time, operating the central processing unit to retrieve the first vehicle from the parking site and to control unmanned movement of the first vehicle from the parking site along a second route of the plurality of routes chosen by the central processing unit to a retrieval location; and
   transferring operational control of the first vehicle back to the user at the retrieval location;
   wherein the first and second routes are calculated by the central processing unit depending on information concerning at least one other route of the plurality of routes for at least one other vehicle of the plurality of vehicles managed by the central processing unit.

2. The method of claim 1, wherein the retrieval location is determined depending on a position of a communication device carried by the user and the retrieval location is communicated by the central processing unit to the communication device.

3. The method of claim 2, wherein the central processing unit communicates a message to the communication device carried by the user.

4. The method of claim 1, wherein the first and second routes are determined by the central processing unit based on a destination location provided in advance by the user so that a distance to be covered on foot for the user is minimal.

5. The method of claim 1, wherein the first and second routes are determined by the central processing unit depending on a current capacity utilization of respective roads and parking sites.

6. The method of claim 1, wherein the first and second routes are determined by the central processing unit depending on a capacity utilization of respective roads expected at a handover time to be provided in advance by the user.

7. The method of claim 1, wherein the first route is determined by the central processing unit so that the parking site is closest to the first location.

8. The method of claim 1, wherein the first route is determined by the central processing unit so that the parking site is the closest parking site to the first location having parking charges that lie within a budget predefined by the user.

9. The method of claim 1, wherein the step of operating the central processing unit to retrieve the first vehicle from the parking site and to control unmanned movement of the first vehicle from the parking site along the second route to the retrieval location is controlled so that the vehicle is provided at the retrieval location at a time defined by the user.

10. The method of claim 9, further comprising operating the central processing unit for temporarily parking the vehicle at a suitable location chosen by the central processing unit until it is possible for the vehicle to be accepted by the user at the retrieval location.

11. The method of claim 1, further comprising retrieving the user of the vehicle by a second vehicle driven by a second user at a selected location and transporting the user to the first vehicle, wherein both the user of the first vehicle and the second user are informed of the transport beforehand by the central processing unit.

12. The method of claim 1, wherein the first vehicle is selected from all vehicles of a brand, all vehicles of a corporation, all vehicles on a specific road, or all vehicles in a specific region.

13. A system for controlling movement of a vehicle, the system comprising:
   a central processing unit configured to control unmanned movement of a first vehicle along a first route from a first location to a second location;
   a first wireless communication device associated with the first vehicle;

a relay station configured to enable wireless communication between the central processing unit and the first wireless communication device;

wherein, at the first location, a user of the first vehicle transfers operational control of the first vehicle to the central processing unit;

wherein the second location is a parking site;

wherein the central processing unit determines the first route based on a plurality of routes for a plurality of vehicles and based on current traffic conditions on respective roads to be used; and wherein the central processing unit determines a second route from the second location to a retrieval location where operation control of the first vehicle is transferred back to the user.

14. The system of claim 13, wherein the central processing unit is configured to control unmanned movement of the first vehicle from the second location to the retrieval location.

15. The system of claim 13, wherein the retrieval location is identical to the first location.

16. The system of claim 13, wherein the central processing unit is configured to control the plurality of vehicles to enable users of the vehicles to accept the respective vehicle as quickly as possible.

17. The system of claim 13, further comprising a second wireless communication device associated with the user, wherein the retrieval location is determined by the central processing unit based on the location of the second wireless communication device.

18. The system of claim 17, wherein the first vehicle remains at the second location for a period of time until the central processing unit receives a retrieval request from the user via the second wireless communication device.

19. A method for unmanned control of a plurality of vehicles, comprising:

transferring control of a first of the vehicles from a user of the first vehicle to a central processing unit at a first location;

operating the central processing unit to control unmanned movement of the first vehicle along a first route determined by the central processing unit from the first location to at least one parking site;

operating the central processing unit to retrieve the first vehicle from the parking site and to control movement of the first vehicle from the parking site along a second route chosen by the central processing unit to a retrieval location; and transferring control of the first vehicle back to the user at the retrieval location;

retrieving the user of the vehicle by a second vehicle driven by a second user at a selected location and transporting the user to the first vehicle, wherein both the user of the first vehicle and the second user are informed of the transport beforehand by the central processing unit;

wherein the first and second routes are calculated by the central processing unit dynamically depending on information concerning further routes for further vehicles of the plurality of vehicles managed by the central processing unit.

\* \* \* \* \*